US009733723B2

(12) United States Patent
Bodnar et al.

(10) Patent No.: US 9,733,723 B2
(45) Date of Patent: Aug. 15, 2017

(54) APPARATUS FOR REMOTE APPLICATION OF MANUAL SIGNATURES TO ELECTRONIC DOCUMENTS

(71) Applicant: Scriptel Corporation, Columbus, OH (US)

(72) Inventors: Michael Bodnar, North Canton, OH (US); Winston J. Powers, Rochester, NY (US)

(73) Assignee: Scriptel Corporation, Columbus, OH (US)

( * ) Notice: Subject to any disclaimer, the term of this patent is extended or adjusted under 35 U.S.C. 154(b) by 0 days.

(21) Appl. No.: 13/771,843

(22) Filed: Feb. 20, 2013

(65) Prior Publication Data

US 2013/0215078 A1    Aug. 22, 2013

Related U.S. Application Data

(60) Provisional application No. 61/600,809, filed on Feb. 20, 2012.

(51) Int. Cl.
| | |
|---|---|
| *G06F 3/0354* | (2013.01) |
| *G06F 13/00* | (2006.01) |
| *G06K 9/00* | (2006.01) |
| *H04L 9/00* | (2006.01) |
| *G06F 3/02* | (2006.01) |
| *G06F 3/038* | (2013.01) |
| *G06F 21/32* | (2013.01) |

(52) U.S. Cl.
CPC ............ *G06F 3/0227* (2013.01); *G06F 3/038* (2013.01); *G06F 3/0354* (2013.01); *G06F 21/32* (2013.01)

(58) Field of Classification Search
CPC ...... G06F 3/0227; G06F 3/0354; G06F 3/038; G06F 21/32; H04L 29/06809
USPC ............................ 345/156, 173–174; 341/90
See application file for complete search history.

(56) References Cited

U.S. PATENT DOCUMENTS

| | | | |
|---|---|---|---|
| 4,678,869 A | 7/1987 | Kable | |
| 5,448,044 A * | 9/1995 | Price .................... | G07C 9/0015 178/18.01 |
| 5,544,255 A | 8/1996 | Smithies et al. | |
| 5,892,824 A * | 4/1999 | Beatson et al. ............... | 713/186 |
| 6,393,395 B1 * | 5/2002 | Guha ................. | G06K 9/00872 382/186 |
| 6,415,341 B1 * | 7/2002 | Fry et al. ......................... | 710/62 |
| 6,694,045 B2 * | 2/2004 | Chung et al. ................. | 382/119 |

(Continued)

FOREIGN PATENT DOCUMENTS

WO    0002149 A1    1/2000

OTHER PUBLICATIONS

International Search Report, Patent Cooperation Treaty Application No. PCT/US2013/026920, mailed Jan. 24, 2014.

*Primary Examiner* — Amr Awad
*Assistant Examiner* — Stephen Bray
(74) *Attorney, Agent, or Firm* — Barclay Damon, LLP

(57) ABSTRACT

A remote data capture system includes a host computing device and a client computing device communicatively coupled to the host computing device. A capture device is coupled to the client computing device. The capture device is configured to receive an electrical input signal from a sensor and convert the input signal to corresponding input data having a predetermined electronic data format. The client computing device selectably transmits the input data to the host computing device.

7 Claims, 2 Drawing Sheets

(56) References Cited

U.S. PATENT DOCUMENTS

| | | | |
|---|---|---|---|
| 2002/0143994 A1* | 10/2002 | Sun | H04L 12/1827 709/246 |
| 2003/0004750 A1 | 1/2003 | Teraoka et al. | |
| 2005/0055627 A1* | 3/2005 | Lloyd | G06F 17/21 715/268 |
| 2005/0185842 A1* | 8/2005 | Williams | G06K 9/222 382/187 |
| 2007/0065021 A1* | 3/2007 | Delgrosso | G06K 9/00154 382/232 |
| 2008/0033835 A1* | 2/2008 | Philyaw | G06F 17/30876 705/26.1 |
| 2011/0179289 A1* | 7/2011 | Guenther | 713/189 |
| 2011/0185184 A1 | 7/2011 | Guenther | |
| 2012/0310756 A1* | 12/2012 | Agashe | G06Q 20/206 705/17 |
| 2013/0063745 A1* | 3/2013 | Tecu et al. | 358/1.13 |

\* cited by examiner

APPARATUS FOR REMOTE APPLICATION OF MANUAL SIGNATURES TO ELECTRONIC DOCUMENTS

CROSS-REFERENCE TO RELATED APPLICATIONS

This application claims priority to U.S. provisional application 61/600,809, filed Feb. 20, 2012, the contents of which are hereby incorporated by reference.

FIELD

The present invention relates generally to a signature capture device. In particular, the present invention relates to a means for applying manual signatures to documents presented electronically to a remote user.

BACKGROUND

Electronic transactions have become commonplace. Consumers typically engage with the providers of goods and services over the internet in order to make purchases. To accommodate such electronic transactions, various measures have been adopted to verify that the undertaken transaction was authorized by the party to be held accountable for it. Unlike face-to-face transactions, wherein parties to a transaction can simply apply their handwritten signature to a document, electronic transactions are not so easily signed.

Systems exist that provide for the collection of handwritten signatures on electronically delivered documents. As currently practiced a sensor panel, such as a resistive or capacitive type, is provided at the signer's (client) location. A host computer may provide a client computer with a designated window, such as an internet browser web page, for the placement of a recognizable handwritten electronic signature. When the panel is traversed by a stylus in the handwriting transaction, it outputs x-y coordinate data derived from a voltage gradient on the panel corresponding to the handwritten signature scribed thereon. This data is then digitized by an associated controller output to the host computer, which interpolates the digitized coordinate data and places indicia within the window corresponding to the handwritten signature scribed onto the sensor panel. The protocol, sent by the controller, is interpolated by a host computer executing operating-specific software. (e.g., Microsoft Windows, Apple Mac or Linux).

The present method for accomplishing the task of capturing a digitized handwritten signature under the foregoing scenario suffers from a number of shortcomings. First, the user must have access to both the signature capture hardware and the corresponding software installed on the users' client computer or device. Under this system the operating system of the client computer must be known in order to get compatible software to communicate with the digitizer. This is commonly referred to as "installing a driver" to provide connectivity between the hardware device and the client computer.

It should also be noted that if web pages are sent by the host computer to the client computer by way of the internet, and the client computer is running Microsoft Windows as the operating platform and running Microsoft Internet Explorer as the browser, then typically an "Active X" program for down load must be downloaded to the client computer in order for the signature device to properly communicate with the host via the internet. Thus, companies that need to deliver electronic documents to customers for signature face a number of communication issues when trying to communicate with client computers that are typically using a significant number of different computer operating systems.

Dealing with a large number of different operating systems presents the host computer with an equally large number of dynamic variables. Compatible software must be loaded onto the client device to interpret the protocol of the signature capture hardware attached to the system. In addition to the client computers that require customized start-up assistance, it can be expected that there will be significant resources expended in the labor and tedium involved in getting the host computer synchronized with each of the client devices to which it is in communication.

There is a need for a device that would enable a customer or other contracting party to affix their handwritten signature to an electronically delivered document which is simple, secure, interfaces with all major operating systems and which provides a verified electronic signature, in real time, that is virtually indisputable.

SUMMARY

To address the shortcomings found in the existing hardware/software solutions designed to capture handwritten signatures for electronic documents, one embodiment of the invention utilizes firmware that resides on the digitizer control board or near thereto that, when coupled to the client computer, provide signals pursuant to a pre-defined output protocol, such as keyboard key codes (a.k.a. scan codes), emulating a standard computer keyboard. Thus, the client computer will recognize the signature capture device as a standard keyboard having a predetermined, translatable data stream as an output, recognized and compatible with client computers running a variety of different operating platforms.

In one embodiment of the present invention a remote data capture system includes a host computing device and a client computing device communicatively coupled to the host computing device. A capture device is coupled to the client computing device. The capture device is configured to receive an electrical input signal from a sensor and convert the input signal to corresponding input data having a predetermined electronic data format. The client computing device selectably transmits the input data to the host computing device.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
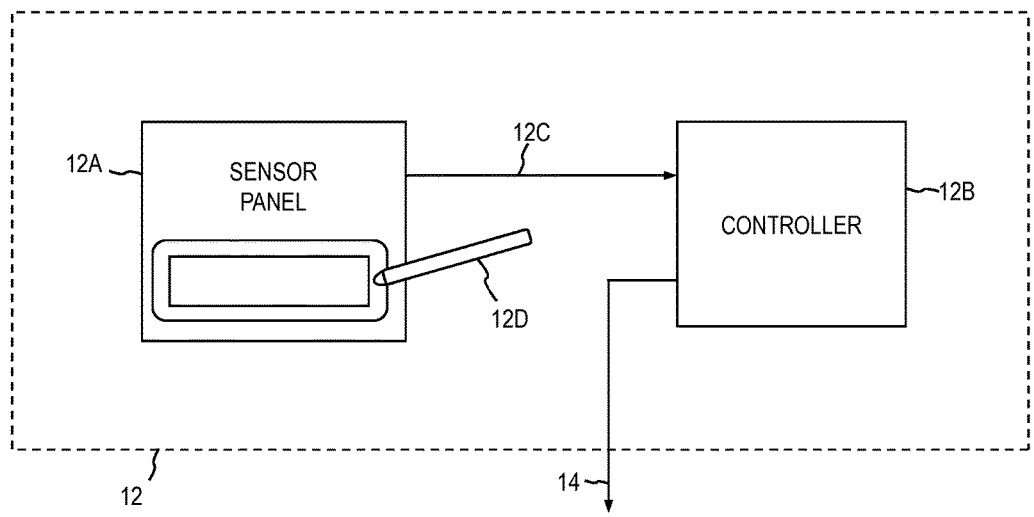
FIG. 1 is a schematic block diagram of a signature capture device according to an embodiment of the present invention.
Figure 2:
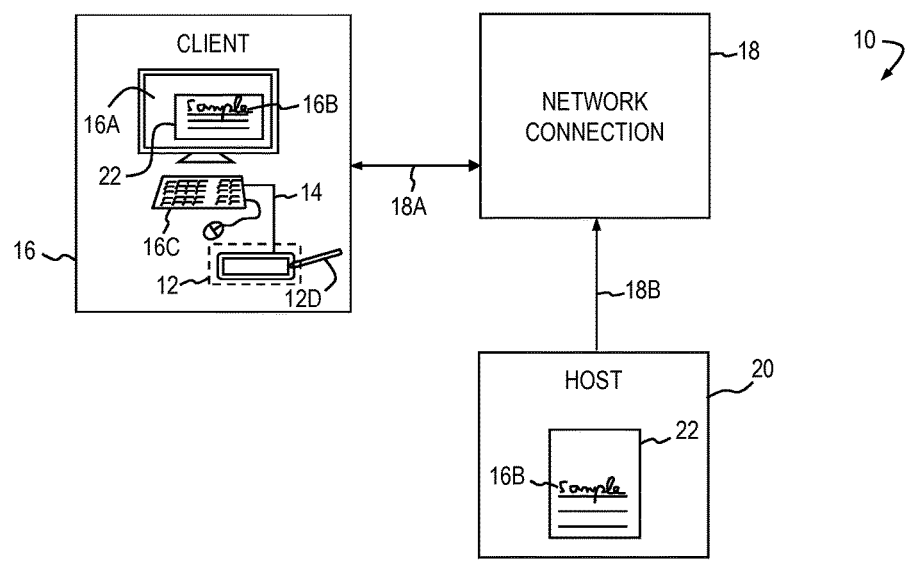
FIG. 2 is a schematic block diagram depicting a remote signature capture system and method in accordance with an embodiment of the disclosed invention.

Referring to FIGS. 1 and 2, a remote signature capture system and methodology 10, according to an embodiment of the present invention, is shown. A stylus-based signature capture device 12 is shown and comprises a sensor panel 12A and an associated controller 12B interconnected via connection 12C. A stylus 12D may be used to "write" signatures upon sensor panel 12A. An electronic interface 14 is utilized to communicatively couple signature capture device 12 to a client computer 16.

In one non-limiting example embodiment of the present invention signature capture apparatus 12 may be supplied as a Model ST1500U, available from Scriptel Corporation of Columbus, Ohio. Sensor panel 12A may be of a capacitive, resistive or other suitable construction. Firmware is provided within signature capture device 12 on controller 12B and provides the intelligence to convert movements of a stylus 12D upon the face of sensor panel 12A into data corresponding to the trace of the stylus, i.e., a handwritten signature. In addition to converting stylus 12D movements into handwriting signature data, predetermined electronic hardware, software, firmware or a combination thereof associated with controller 12B may utilize a pre-defined "encoding key" to convert the handwriting signature data into a series of key codes/scan codes, such as those output from a standard computer keyboard, as at 16C.

As is commonly understood, a keyboard wedge is a hardware device or software program that interfaces with a computer to translate data read by a device other than a keyboard, such as a magnetic strip, bar code reader or other such scanning device, into keyboard data. The term "wedge" comes from the fact that the hardware device typically sits, or wedges, between the keyboard and the system unit. In the case of an embodiment of the present inventions, the wedge is resident within firmware located within controller 12B. Heretofore, there is no known instance of the keyboard wedge being used to interface a signature capture device, such as at 10, associated with a client computer 16, with an electronic document delivered by a host computer, as at 20, for a handwritten signature.

In practice, a document 22 residing on or accessible by a host computer 20, needing to be signed with a handwritten signature of a party is delivered by the host computer to a client computer 16 via an electronic communication system 18, such the internet, modem or other communications methodology. A first communication connection 18A is made to client computer 16, while a second communication connection 18B is made to host computer 20. A network, such as the internet or any of the other previously-mentioned communication systems, may be intermediate communication connections 18A, 18B to facilitate communication between client computer 16 and host computer 20.

Once a document 22 is presented to the client computer 16 for signature, a signature block 16B for an electronic document, etc. may be presented on the client computer screen 16A. A user at the client computer 16 positions a cursor on the signature line of the document within the document window 16B and then scribes a handwritten signature onto the sensor panel 12A of signature capture apparatus 12. As the signature is scribed, corresponding signature data is generated and acted upon by a pre-defined "encoding key" which generates a key code/scan code data stream which the client computer translates into a string of ASCII or Unicode characters. The document 22 to be signed, which appears on computer screen 16A, is provided with a "decoding key" corresponding to the "encoding key" that was used to create the encoded character string embedded within it or in a separate, but related, data file. A graphic representation of the signature appears within the signature block 16B on the client computer. Signature capture device 12 is coupled to the processing component of the client computer via a standard interface, such as through a "USB" port which may be directly connected to the computer (not shown) or to an interfacing connector on keyboard 16, as shown in FIG. 2, which is in turn coupled to the computer. In this manner, signature capture device 12 essentially emulates the characteristics of a standard computer keyboard, and appears electronically to be a standard keyboard, as far as the rest of the system components are concerned.

Although previously described as hardware, wedges may be provided as software. Software wedges are programs that reroute the data once it has been input into a computer, typically through a data interface such as a "COM" port. The input data is routed to the keyboard buffer by the software, making it appear as if it entered the system through the keyboard. Keyboard wedges can be used simultaneously with keyboards.

Once the user enters a signature via signature capture apparatus 12, it may be verified by reviewing the signature window 16B on client computer screen 16A. In the alternative or as a redundancy, the signature can also appear and be verified via the sensor panel 12A. Upon verification that the signature is legible and of sufficient quality, the signature and the electronic document to which it was attached may be "cast" and then released to the host computer 20. For purposes of this disclosure, the term "cast" means that the document and all signatures applied thereto becomes fixed in time by applying an embedded digital stamp or signature that would verify its integrity. In the alternative, the signature entered onto the signature capture apparatus 12 may simultaneously appear on the screen of the host computer 20. However, in this case, it may well be desirable to maintain the signature as a transient until it is finally cast in the document by the user.

Once the document has been cast with a handwritten signature it may be printed remotely, transmitted electronically or stored for future access by authorized parties.

Figure 3:
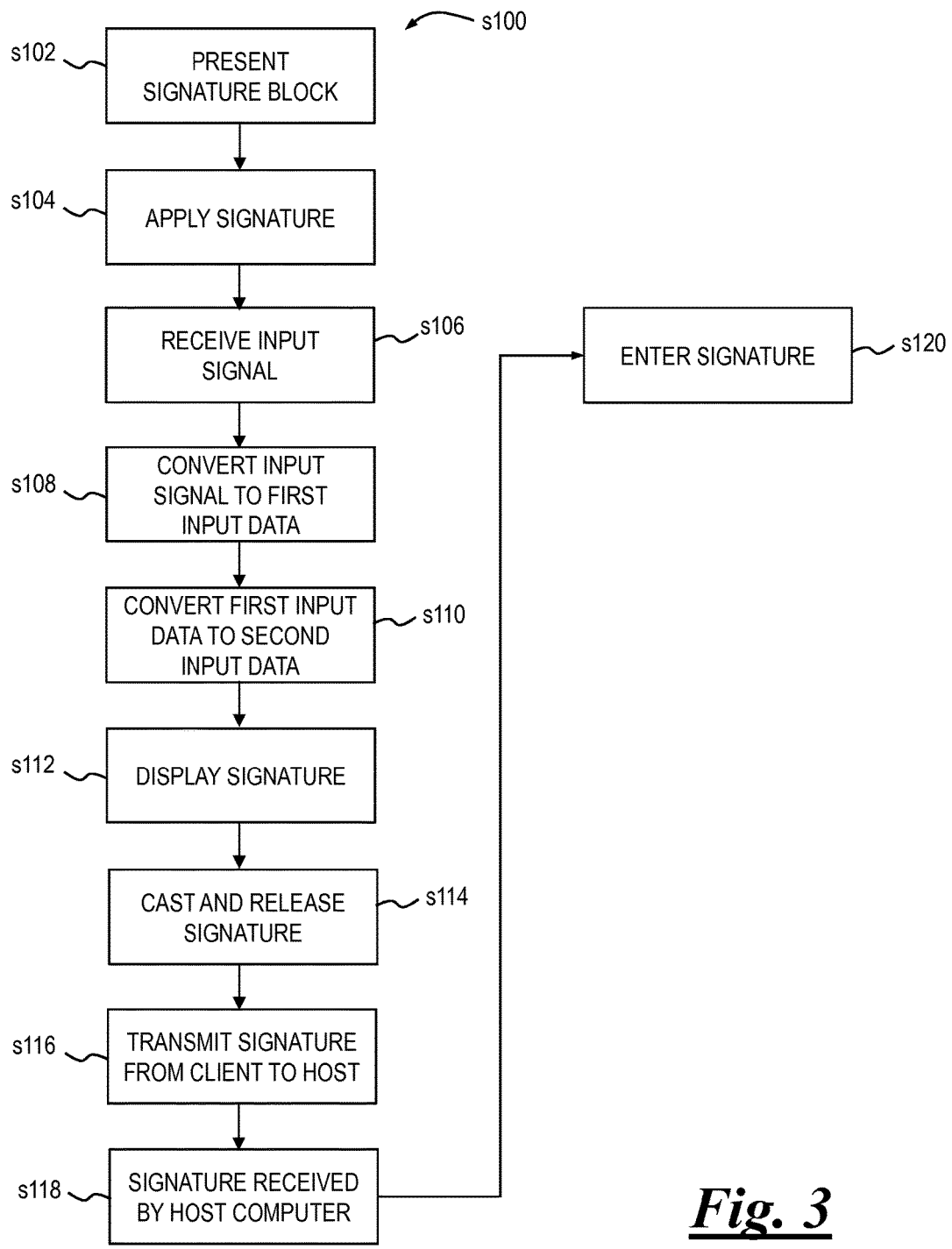
FIG. 3 is a flow diagram showing a process for providing remote application of signatures to electronic documents according to an embodiment of the present invention.

With continued reference to FIGS. 1 and 2, the general arrangement of a process s100 for providing remote application of signatures to electronic documents is shown in FIG. 3 according to an embodiment of the present invention. At s102 a user is presented with a document 22 having a signature block 16B for signature, the signature block being presented on computer screen 16A of client computer 16.

At s104 the user utilizes stylus 12D to apply a signature on sensor panel 12A of signature capture device 12. Sensor panel 12A generates an electrical input signal corresponding to the signature.

Signature capture device 12 receives at s106 the input signal from sensor panel 12 corresponding to the user's signature and, at s108, converts the input signal to a corresponding first group of input data having a first electronic data format. Any suitable standard, non-standard, or proprietary electronic data format may be used for first electronic data format.

At s110 the first data format of s108 is converted to a corresponding second group of input data having a second predetermined data format. Any suitable standard, non-standard, or proprietary electronic data format may be used for second electronic data format such as, for example, a string of ASCII or Unicode characters.

In an alternate embodiment of the present invention the input signal of s106 may be directly converted to the format of the second group of input data described at s110, thereby omitting the intermediate step of converting the input signal to the format of the first group of input data as at s108.

The signature applied at s104 is displayed upon client computer screen 16A at s112. The signature may also be displayed on sensor panel 12A in addition to (or instead of) the client computer screen. If the signature is acceptable to the user, at s114 the user "casts" the signature as previously described and releases the signature for transmission to host computer 20.

At s116 the electronic signature, in the form of the aforementioned second input data, is transmitted from client computer 16 to host computer 20 via electronic communication system 18.

The electronic signature is received by host computer 20 at s118. Host computer 20 may utilize the format of the second input data to generate a signature corresponding to the signature applied by the user at s104. Alternatively, host computer 20 may convert the electronic signature from the format of the second input data to an output signal having a predetermined output format corresponding to the signature applied by the user at s104, the output signal being suitable to generate a signature corresponding to the signature applied by the user at s104.

At s120 the received, generated signature may be entered, e.g., applied to document 22, printed remotely from the client computer 16 at host computer 20, further transmitted electronically, or stored for future access by authorized parties, etc.

According to an embodiment of the present invention, no dedicated software is required to be installed and running on the client computer 16 in order to implement the handwriting signature capture system 10. The installation may be as simple as plugging the signature capture device 12 into the client computer 16 using a standard human interface connection, such as the Universal Serial Bus ("USB"). The client computer 16 will typically recognize the capture device 12 and confirm installation of a standard keyboard driver compatible with the operating system residing on the client computer 16. Thus, the capture device 12 need only be compatible with the client computer 16 and is platform-independent with respect to the host computer 20, which only "sees" an output of ASCII or Unicode characters from the client computer.

According to an aspect of an embodiment of the present invention, a service provider sending web-based documents 22 from a host computer 20 can imbed code within the document as a "decoding key" to translate the output character string from the signature capture device 12 attached to the client machine 16 into a series of x-y coordinate data points. A plot of the coordinate data is then drawn within the prescribed area on the document 22 on the host web page, thus inserting an electronic handwriting signature on the desired document at a predetermined point, such as where the cursor has been previously placed. After the signature is placed within the designated area of the given document on the host computer using stylus 12D, the completed document 22 with the affixed signature may be sent to the client computer 16 as a confirmation of a completed transaction, "cast" in time and then be stored in any number of different formats for retrieval at a later date.

According to another aspect of an embodiment of the present invention, the character string output from the signature capture device 12 may be encrypted to prevent the unauthorized interception and misuse of the transmitted signature data. For added security and utility, an aspect of the invention also provides for security indicia affixed to and/or embedded within the properties of the document 22 that uniquely correspond with the condition of a given document at the time that it was completed and/or signed, or otherwise "cast" in time.

Some of the advantages associated with embodiments of the present invention include lower costs at both the client end and the host end of the transaction. Because the interfacing problems during install and uninstall are removed, there is an advantage of reduced setup time and wasting valuable resources. Since the preferred embodiments of the present invention are platform-independent, there is no need to provide or maintain multiple versions of software for numerous operating systems, as is required by the signature capture devices presently available.

Although the present invention as described above is directed to capturing signatures, it will be appreciated that any form or type of information generated by a user with signature capture device 12 may be transmitted from client computer 16 to host computer 20.

While this invention has been shown and described with respect to a detailed embodiment thereof, it will be understood by those skilled in the art that changes in form and detail thereof may be made without departing from the scope of the claims of the invention.

What is claimed is:

1. A signature capture system comprising:
    a client computer;
    a signature capture device operatively connected to the client computer, the signature capture device having:
        a sensor panel configured to receive a handwritten signature applied to the sensor panel by a stylus, and
        a controller operatively connected to the sensor panel;
    the controller being configured to:
        convert the handwritten signature from the sensor panel into a series of x-y coordinate signature data points,
        emulate a standard computer keyboard typically requiring standard driver software provided by an operating system,
        convert the series of signature data points into a format compliant with the emulated computer keyboard, and
        transmit the converted signature data points as a data stream to the client computer such that the client computer uses the standard driver software provided by the operating system and does not require dedicated software to be installed and running to receive the data stream from the signature capture device.

2. The signature capture system of claim 1 further comprising:
    a host computer operatively connected to the client computer;
    the host computer configured for delivering an electronic document having a signature block to the client computer for signature.

3. The signature capture system of claim 2, wherein the client computer is configured to:
    using a decoding key, translate the data stream received from the signature capture device into a series of x-y coordinate signature data points,
    the x-y coordinate signature data points representing the handwritten signature on the sensor panel, and
    display the handwritten signature in the signature block.

4. The system of claim 3 wherein the client computer is further configured to selectably cast the electronic document and handwritten signature.

5. The signature capture system of claim 3, further comprising:

the host computer being configured to:
   receive the data stream from the client computer,
   convert the data stream to a signature data set representing the handwritten signature,
   cause the handwritten signature to be displayed in the signature block.

6. The system of claim 5 wherein the host computer is further configured to selectably cast the electronic document and handwritten signature.

7. A method for providing remote application of signatures to electronic documents using a signature capture device, the capture device having a stylus, a sensor panel and a controller operatively connected to the sensor panel, the method comprising:
   using the stylus, applying a handwritten signature as an input signal on the sensor panel of the signature capture device;
   using the controller, converting the input signal to a series of x and y coordinate signature data points,
   using the controller to emulate a standard computer keyboard typically having standard driver software provided by an operating system, and converting the series of x and y coordinate signature data points into a format compliant with that of the emulated computer keyboard;
   transmitting the converted signature data points as a data stream to a client computer such that the client computer uses the standard driver software provided by the operating system and does not require dedicated software to be installed and running to receive the data stream from the signature capture device.

* * * * *